Oct. 20, 1931.  W. H. MAXWELL  1,828,118
BEARING MOUNTING
Filed April 4, 1929
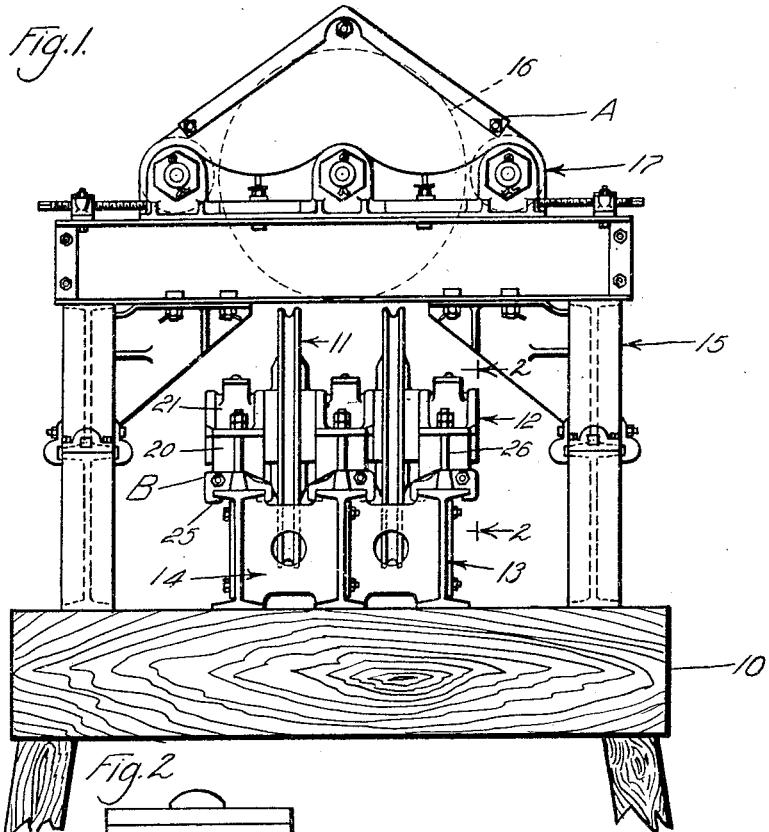
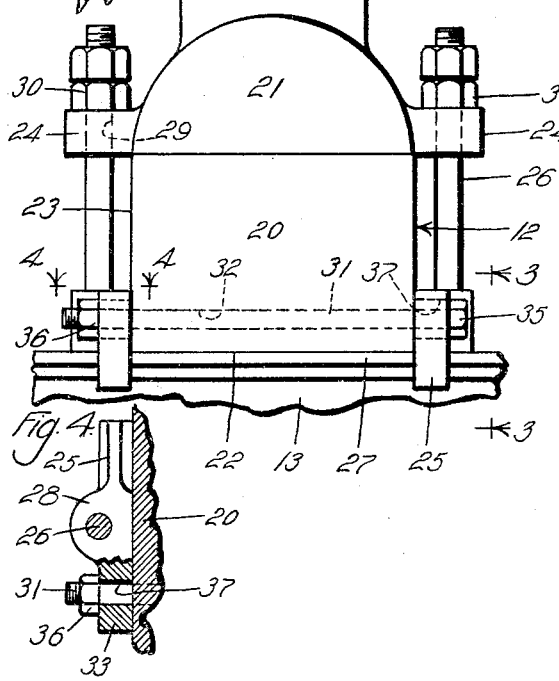
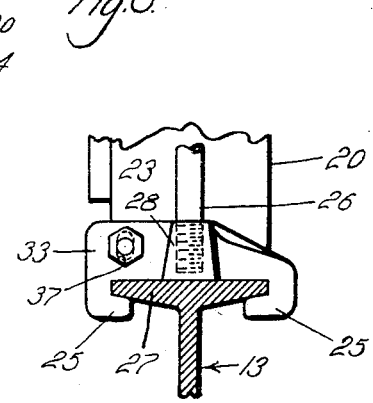
Inventor
W. H. Maxwell Patented Oct. 20, 1931

1,828,118

UNITED STATES PATENT OFFICE

WILLIAM H. MAXWELL, OF BEVERLY HILLS, CALIFORNIA, ASSIGNOR TO BAASH-ROSS TOOL COMPANY, INCORPORATED, OF LOS ANGELES, CALIFORNIA, A CORPORATION OF CALIFORNIA

BEARING MOUNTING

Application filed April 4, 1929. Serial No. 352,533.

This invention has to do with a bearing mounting which is of general utility and which is particularly useful in crown blocks and like structures. It is a general object of the present invention to provide a bearing mounting which is inexpensive, practical, and dependable.

Crown blocks, such as are used on well drilling derricks, and the like, require bearing mountings which permit the bearings to be shifted or adjusted and at the same time require that the mountings be secure and dependable. The usual crown block involves a frame formed of I beams, or the like, and the sheave carrying bearings are mounted on the beams.

It is a general object of the present invention to provide a mounting for a crown block bearing whereby the bearing is mounted so that it can be shifted or adjusted in the desired manner and can be set or secured firmly in position for operation.

A further object of the present invention is to provide a mounting of the character mentioned which is automatically clamped or made tight on the supporting beam as the cap is clamped in place.

It is a further object of this invention to provide a bearing mounting of the character mentioned in which the parts are assembled or connected with the bearing so that they cannot become displaced or dislodged.

Another object of the present invention is to provide a bearing mounting of the character mentioned including a single member operating to hold the mounting parts at opposite sides of the bearing in position in connection with the bearing.

It is a further object of the invention to provide a bearing mounting of the character mentioned which eliminates various lugs, projections, and other parts usually provided on a bearing to engage and hold the mounting means.

The various objects and features of the invention will be best and more fully understood from the following detailed description of a typical form and application of the invention, throughout which description reference will be had to the accompanying drawings, in which:

Fig. 1 is a view illustrating a popular type of crown block in place on the top of a derrick, showing certain of the bearings of the block mounted by means of the present invention. Fig. 2 is an enlarged end elevation of a bearing of the crown block, being a view taken as indicated by line 2—2 on Fig. 1. Fig. 3 is a detailed sectional view taken as indicated by line 3—3 on Fig. 2, and Fig. 4 is a plan section taken as indicated by line 4—4 on Fig. 2.

The bearing mounting provided by this invention is particularly useful as applied to the bearings of crown blocks, and therefore I have illustrated a popular form of crown block including upper and lower sections A and B. The lower section B includes a frame which rests on the top of the derrick 10, a plurality of sheaves 11, and bearings 12 mounting the sheaves on the frame. The frame includes a plurality of suitably arranged I beams 13 connected together by end plates 14. The upper section A of the crown block includes a frame 15 which fits over or straddles the lower section B of the block, a plurality of sheaves 16, and mounting means 17 whereby the sheaves are mounted on the frame 15 above the sheaves of the lower section and transverse of the sheaves of the lower section.

The construction provided by this invention is shown employed for mounting the bearings 12 of the lower section B on the beams 13 of the lower section. It is to be understood, of course, that the invention may be carried out in various parts of a crown block or in crown blocks of various forms or types of construction. The mounting provided by the present invention may be used to advantage in connection with the standard type of bearing, that is, in connection with a bearing including a block or body 20 to rest on a support or beam 13, and a cap 21 to be secured on the body. In the form of bearing illustrated the body 20 is provided with a flat bottom 22 to rest on the top of an I beam 13 and has flat plain sides 23. The cap 21 fits over the body 20 and is designed to hold a shaft, or the like, in the body. The cap 21 has flanges 24 which overhang or project from the sides 23 of the body.

The mounting provided by this invention includes units at the two sides of the bearing to engage the beam 13 and to be connected with the bearing. Each unit includes jaws 25 for engaging the beam, a stem 26 carried by the jaws and extending upwardly to project through one of the flanges 24 of the bearing cap 21. The two jaws 25 are oppositely disposed to engage the flanges 27 of the beam 13, and in the preferred form of the invention the jaws are in the form of a single or unitary casting. The stem 26 is attached to or carried by an enlarged part 28 of the jaw casting and extends upwardly to project through an opening 29 formed vertically through the flange 24. In practice the stem 26 may be screw threaded into the part 28. The upper end portion of the stem 26 is screw threaded to carry a clamping nut 30. The clamping nut is tightened against the upper side of the flange 24 so that the jaws 25 are drawn upwardly against the under sides of the flanges 27, while the cap 21 is clamped downwardly on the body 20.

In accordance with the present invention, I provide means for securing or connecting the units above described to the body 20 of the bearing. In the preferred form of the invention this means includes a single bolt 31 engaging the jaw castings and extending through an opening 32 in the body 20. The jaw casting of each unit is provided with a part 33 having an opening to pass the bolt 31, the openings in the parts 33 being located to register with the opening 32 in the body 20 when the parts are in operating position. The bolt 31 is arranged through the parts 33 and the body 20 of the bearing so that the head 35 on one end of the bolt engages one of the parts 33 while the nut 36, screw threaded on the other end, engages the other part 33. In practice the openings 37 provided through the parts 33 to pass the bolt are made such as to allow for a certain amount of vertical movement between the jaw castings and the body of the bearing. This is to prevent the bolt 31 from interfering with the clamping action obtained through the tightening of the nuts 30 on the stems 26. In the drawings I have illustrated the openings 37 in the form of vertically extending slots.

From the foregoing description it will be apparent that the mounting means provided by this invention is extremely simple and inexpensive of manufacture. The units formed by the jaw castings and stems are of simple, inexpensive construction, while the other parts, that is, the nuts 30 and the bolt 31, are standard parts which are inexpensive and easily obtained. It is to be particularly noted that the body 20 of the bearing may be free of projecting lugs or other parts or features of construction designed for engaging or gripping the bearing mounting parts. In accordance with the invention, the body 20 is simply provided with an opening 32 which passes the bolt 31, it being obvious that the opening can be cast or otherwise formed in the body so that it does not complicate the formation or finishing of the body. Further, it is to be noted that the parts of the mounting means are secure against becoming displaced from the block, that is, the construction is without parts such as are liable to become lost or displaced when the bearing cap 21 is removed. In using the construction the bearing cap 21 can be removed whenever desired by simply removing the nuts 30 from the stems 26, and whenever the nuts are removed or are loose on the stems the entire bearing can be shifted or adjusted to any desired position along the beam 13.

Having described only a typical, preferred form of the invention, I do not wish to limit myself to the specific details set forth, but wish to reserve to myself any changes or variations that may appear to those skilled in the art or fall within the scope of the following claims:

Having described my invention, I claim:

1. A mounting for securing a bearing on a support including, a pair of jaws at each side of the bearing engaging the support, a stem extending upwardly from each pair of jaws through the cap of the bearing, a clamp nut on each stem above the cap, and a bolt extending between the pairs of jaws holding them in place at the bearing.

2. A mounting for securing a bearing on a support including, a jaw casting at each side of the bearing having jaws engaging the support and having parts with openings, stems extending upwardly from the castings through the bearing cap, clamp nuts on the stems above the cap, and a bolt extending through the body of the bearing and through the openings in said parts to connect the castings with the bearing.

3. A mounting for securing a bearing on a support including, a jaw casting at each side of the bearing having jaws engaging the support and having parts with openings, stems extending upwardly from the castings through the bearing cap, clamp nuts on the stems above the cap, and a bolt extending through the body of the bearing and through the openings in said parts to connect the castings with the bearing, the connection made by the bolt allowing vertical movement between the castings and the body of the bearing.

In witness that I claim the foregoing I have hereunto subscribed my name this 15th day of March, 1929.

WILLIAM H. MAXWELL.